United States Patent
Jheng

(10) Patent No.: US 11,117,428 B2
(45) Date of Patent: Sep. 14, 2021

(54) TIRE PRESSURE SENSOR STRUCTURE AND FORMING METHOD THEREOF

(71) Applicant: Orange Electronic CO., LTD., Taichung (TW)

(72) Inventor: Sheng-Ji Jheng, Taichung (TW)

(73) Assignee: ORANGE ELECTRONIC CO., LTD, Taichung (TW)

( * ) Notice: Subject to any disclaimer, the term of this patent is extended or adjusted under 35 U.S.C. 154(b) by 251 days.

(21) Appl. No.: 16/419,637

(22) Filed: May 22, 2019

(65) Prior Publication Data

US 2020/0369101 A1 Nov. 26, 2020

(51) Int. Cl.
*B60C 23/04* (2006.01)

(52) U.S. Cl.
CPC ................. *B60C 23/0491* (2013.01)

(58) Field of Classification Search
None
See application file for complete search history.

(56) References Cited

U.S. PATENT DOCUMENTS

| | | | |
|---|---|---|---|
| 7,764,168 B1 | 7/2010 | Huang | |
| 2007/0220963 A1* | 9/2007 | Morita | B60C 23/0408 73/146 |
| 2010/0018302 A1* | 1/2010 | Murray, Jr. | B60C 23/0494 73/146.5 |
| 2010/0148950 A1* | 6/2010 | Yamaguchi | G01L 19/0609 340/442 |
| 2016/0001615 A1* | 1/2016 | Arai | B60C 23/0433 73/146.5 |
| 2018/0370301 A1* | 12/2018 | Sekizawa | B60W 40/06 |
| 2019/0184773 A1* | 6/2019 | Saito | B60C 23/0422 |
| 2019/0263199 A1* | 8/2019 | Yu | B60C 23/0444 |

FOREIGN PATENT DOCUMENTS

| | | |
|---|---|---|
| CN | 101844490 A | 9/2010 |
| CN | 203713438 U | 7/2014 |
| CN | 104191918 A | 12/2014 |
| CN | 204415058 U | 6/2015 |
| CN | 204586383 U | 8/2015 |
| EP | 2746069 B1 | 5/2016 |
| EP | 2842770 B1 | 5/2016 |
| TW | I458652 B | 11/2014 |

* cited by examiner

*Primary Examiner* — Peter J Macchiarolo
*Assistant Examiner* — Jermaine L Jenkins
(74) *Attorney, Agent, or Firm* — Muncy, Geissler, Olds & Lowe, P.C.

(57) ABSTRACT

According to one aspect of the present disclosure, a tire pressure sensor structure includes a housing, a tire pressure sensor, a valve connector and a molding body. The housing is with an opening and has a receiving portion and an assembly portion. The receiving portion is located on the inner surface of the housing, and the assembly portion is located between the receiving portion and the opening. The tire pressure sensor is placed into the receiving portion. The valve connector includes a base and a connecting port. The base fixes with the assembly portion for limiting the tire pressure sensor. The connecting port protrudes from the base to connect a valve of a tire. The molding body is formed on the surface of the base and adjacent to the connecting port to close the opening.

16 Claims, 10 Drawing Sheets

TIRE PRESSURE SENSOR STRUCTURE AND FORMING METHOD THEREOF

FIELD OF THE INVENTION

The present disclosure relates to a tire pressure sensor structure and forming method thereof, and in particular to a tire pressure sensor structure and a forming method thereof which apply the insert molding technique to integrally form a tire pressure sensor.

BACKGROUND OF THE INVENTION

The tire pressure sensor is a product applied to a valve of a tire for detecting the data such as pressure, temperature, and the like. In general, the tire pressure sensor consists of three parts, namely the outer casing, the sensing element and the valve connector, and the sensing element is protected by the outer casing and receives the gas of the tire via the valve connector.

As shown in FIG. 1, in the prior art, the outer casing of the tire pressure sensor 900 is usually in combination with two pieces. That is, the tire pressure sensor 900 is composed of two housings 910, 920 screwed together with screws or threads that are match in size, so as the sensing element 930 can be placed into the inner space of the tire pressure sensor 900. Subject to the combined conditions, the outer diameter of the thread of the housing 920 must be slightly smaller than the inner diameter of the thread of the housing 910, otherwise the two housings cannot be combined. However, since the gas of the tire is imported into the outer casing via the valve connector 940, the gas may leak outward along the gap of the thread of the housings 910, 920, which directly causes the measured value of the tire pressure to decrease, hence an accurate tire pressure cannot be obtained.

In some specific situations, the above problems are particularly serious, such as MRT trains, mining vehicles, large trucks and buses. The nature of this type of vehicle is that the load capacity is quite large and, accordingly, the tire pressure of the tire is also higher than that of a small vehicle. In long-term use, for the tire pressure sensor disclosed in prior art, it is difficult to prevent internal high-pressure gas from leaking out.

In addition, the valve connector 940 of the conventional tire pressure sensor 900 is fixed to the housing 910 by the built-in nut 950, which means that the center of the housing 910 must be provided with an opening 911 for the valve connector 940 to lock the nut 950. Therefore, the gas inside the tire pressure sensor 900 may also leak outward along the gap of the opening 911.

SUMMARY OF THE INVENTION

According to one aspect of the present disclosure, a tire pressure sensor structure includes a housing, a tire pressure sensor, a valve connector and a molding body. The housing is with an opening and has a receiving portion and an assembly portion. The receiving portion is located on the inner surface of the housing, and the assembly portion is located between the receiving portion and the opening. The tire pressure sensor is placed into the receiving portion. The valve connector includes a base and a connecting port. The base fixes with the assembly portion for limiting the tire pressure sensor. The connecting port protrudes from the base to connect a valve of a tire. The molding body is formed on the surface of the base and adjacent to the connecting port to close the opening.

According to another aspect of the present disclosure, a tire pressure sensor forming method includes the following steps. Providing a housing. Setting an opening on the housing, so as to form an inner surface thereon. Setting a receiving portion and an assembly portion on the inner surface, the assembly portion is located between the receiving portion and the opening. Providing a tire pressure sensor and placing the tire pressure sensor into the receiving portion. Providing a valve connector with a base and a connecting port, the connecting port protruding from the base to connect a valve of a tire. Fixing the base with the assembly portion, thereby limiting the tire pressure sensor. Forming a molding body on the surface of the base by insert molding, thus the molding body being adjacent to the connecting port and closing the opening.

DETAILED DESCRIPTION OF THE PREFERRED EMBODIMENTS

To make it easier to understand the objects, characteristics and effects of this invention, the embodiments are descripted with the attached drawings for the detail of the present disclosure.

Figure 2A:
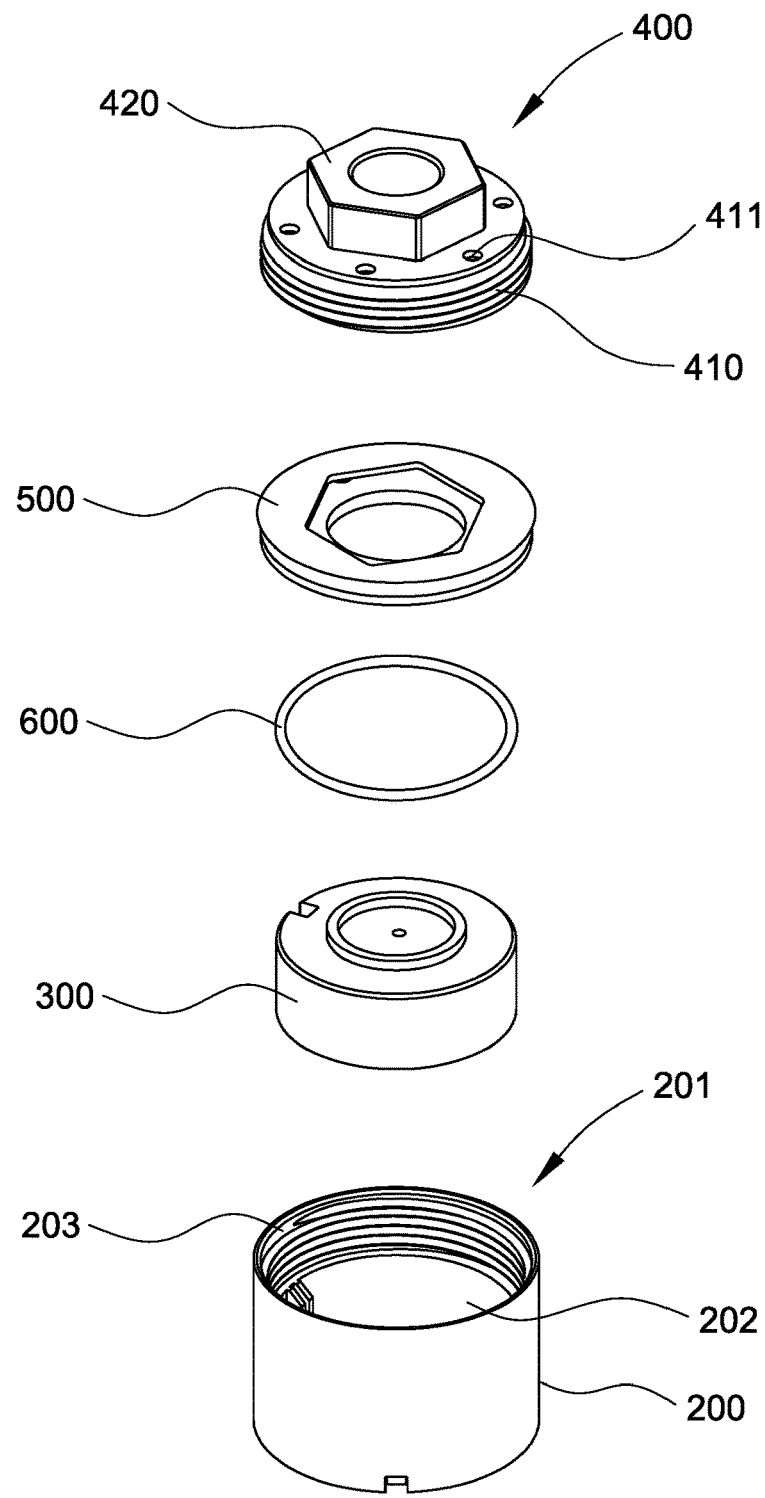
FIG. 2A is an exploded view of a tire pressure sensor structure according to one embodiment of the present disclosure.
Figure 2B:
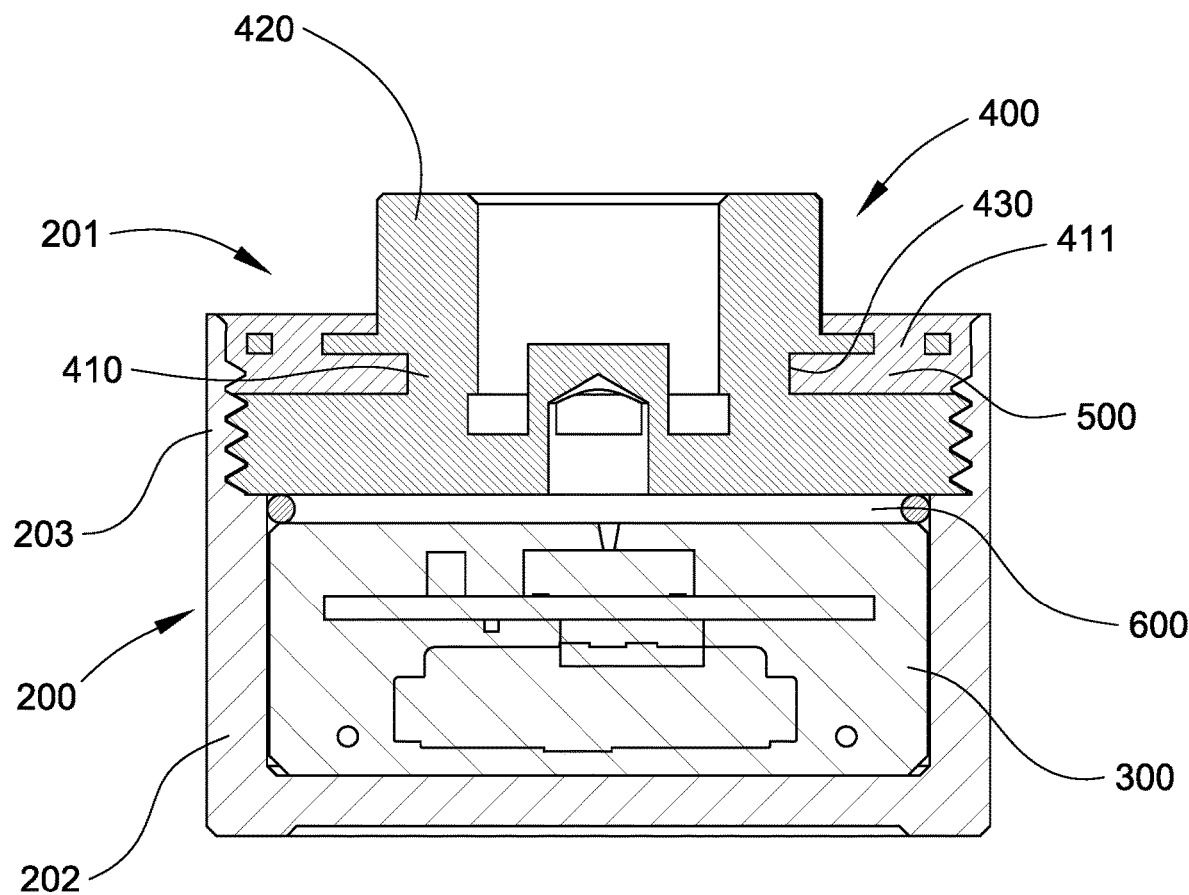
FIG. 2B is a section view of the tire pressure sensor structure of FIG. 2A.

In FIG. 2A and FIG. 2B, a tire pressure sensor structure 100 includes a housing 200, a tire pressure sensor 300, a valve connector 400 and a molding body 500. The housing 200 is an open container with a closed bottom, on the inner surface of the housing 200 a receiving portion 202 is defined, and an assembly portion 203 is set between an opening 201 and the receiving portion 202. The tire pressure sensor 300 is disposed into the receiving portion 202 of the housing 200. On the side, the valve connector 400 closes to the housing 200, a base 410 is provided to connect with the assembly portion 203 of the housing 200. In this embodiment, the base 410 and the assembly portion 203 are fixed to each other by external threads and internal threads. However, other fixed means, such as embedding or snapping, can also be used. On the opposite side of the base 410, a connecting port 420 is provided to connect with a nozzle of a tire (the nozzle and the tire are not shown in figures).

As shown in FIG. 2B, during the insert molding process, the molding body 500 is formed on the surface of the base and adjacent to the connecting port 420 so that to close the opening 201 of the housing 200. In the mentioned insert molding process, the molding body 500 is a moldable liquid which automatically adapts to the shape of the inner wall of the housing 200 and the connecting port 420. Upon the molding body 500 is completely shaped, the molding body 500 and the housing 200 are integrated together, and thus the valve connector 400 is axially fixed. Moreover, since the base 410 is located inside the tire pressure sensor structure 100, even if there is a gap between the base 410 and the housing 200, the gas is blocked by the molding body 500 and therefore to avoid leakage.

It is notable that the surface of the base 410 may be provided with a plurality of insert molding spaces 411 that are not at the central axis thereof. Therefore, after the molding body 500 is filled into the insert molding space 411 and shaped, the molding body 500 and the valve connector 400 are nonrotatable relative to each other, thereby achieving radial fixation.

Figure 1:
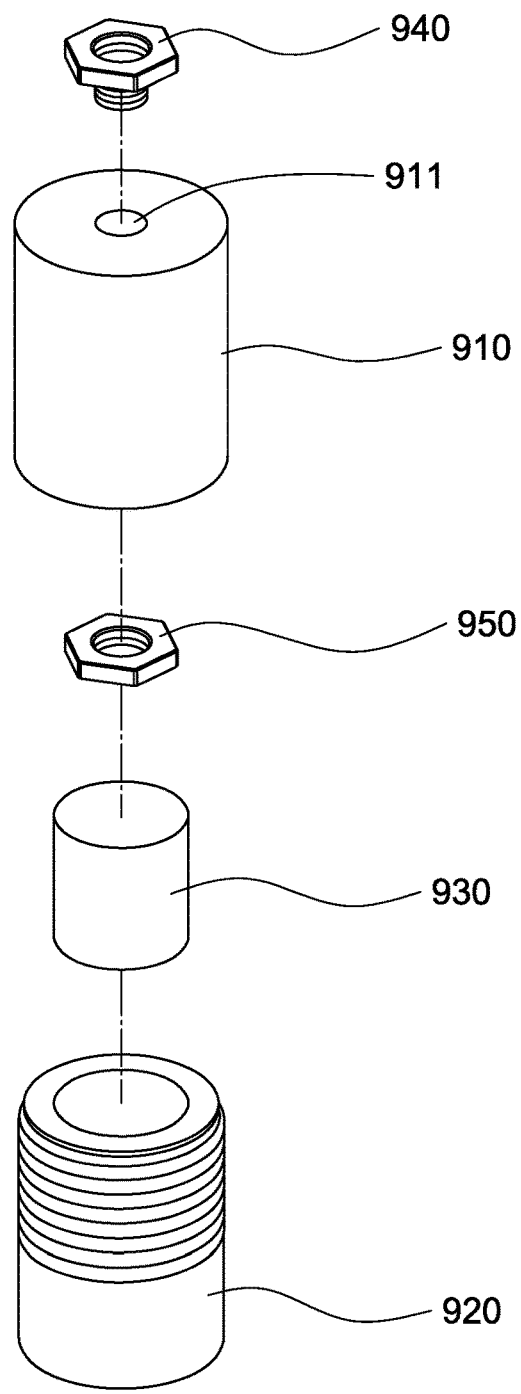
FIG. 1 is an exploded view of a tire pressure sensor in prior art.

Compared with the prior art introduced in FIG. 1, the advantages of this embodiment are at least as below. Firstly, the housing 200 of the present embodiment is integrated into one body, which simplifies the components of the tire pressure sensor structure 100, thereby not only reduces the volume of the tire pressure sensor structure 100, but further reduces the chance of gas leakage.

Secondly, the base 410 of the valve connector 400 provides a first layer of airtightness, while the space between the base 410 and the assembly portion 203, and between the connecting port 420 and the assembly portion 203, are both closed by the molding body 500. Accordingly, the second airtight effect is achieved, which effectively prevents the gas from leaking out of the tire pressure sensor structure 100.

In a preferred embodiment, the tire pressure sensor structure 100 may further include a washer 600, which is disposed between the base 410 and the tire pressure sensor 300, and the outer diameter of the washer 600 is greater than or equal to the outer diameter of tire pressure sensor 300. Consequently, the washer 600 prevents gas from leaking from the recessed portion 202 to the gap between the base 410 and the assembly portion 203, thereby providing the third layer of airtight effect.

In addition, the valve connector 400 can further include a narrowing portion 430, which is filled by its shape by the molding body 500 automatically during the forming process. The narrowing portion 430 is able to increase the area that the base 410 of the valve connector 400 is covered by the molding body 500, so as to further improve the airtight effect and enhance the mechanical strength of the tire pressure sensor structure 100.

In the embodiment of the present disclosure, the material of the valve connector 400 is metal to provide a better protection for the tire pressure sensor 300. Nevertheless, the material of the valve connector 400 is not a limitation to the present disclosure. For instance, the valve connector 400 can also be made of different materials, such as the connecting port 420 can be made of metal, and the base 410 is made of plastic. The molding body 500 can also be made of plastic so that to be integrally formed with the base 410 after the forming process is completed.

Figure 3A:
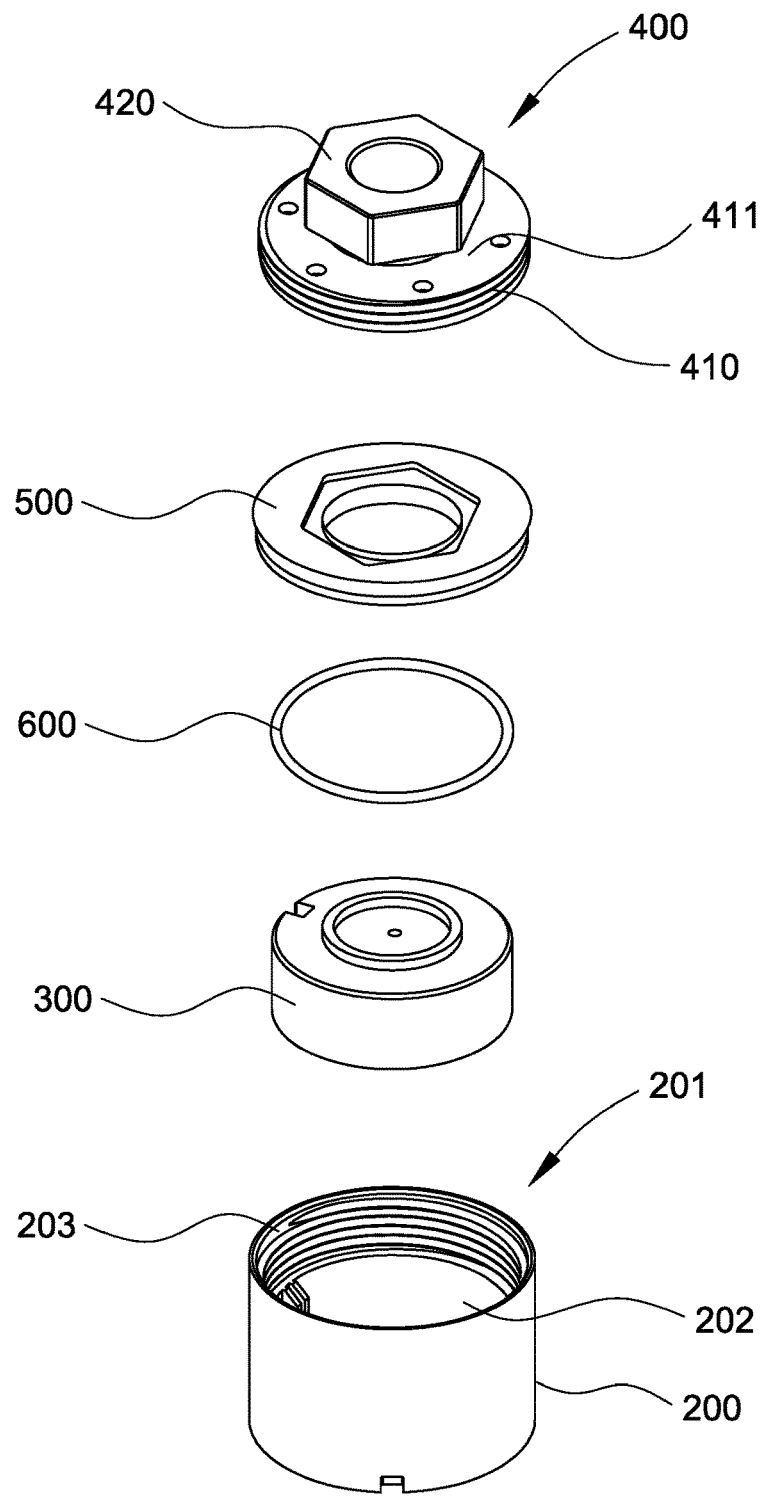
FIG. 3A is an exploded view of a tire pressure sensor structure according to another embodiment of the present disclosure.
Figure 3B:
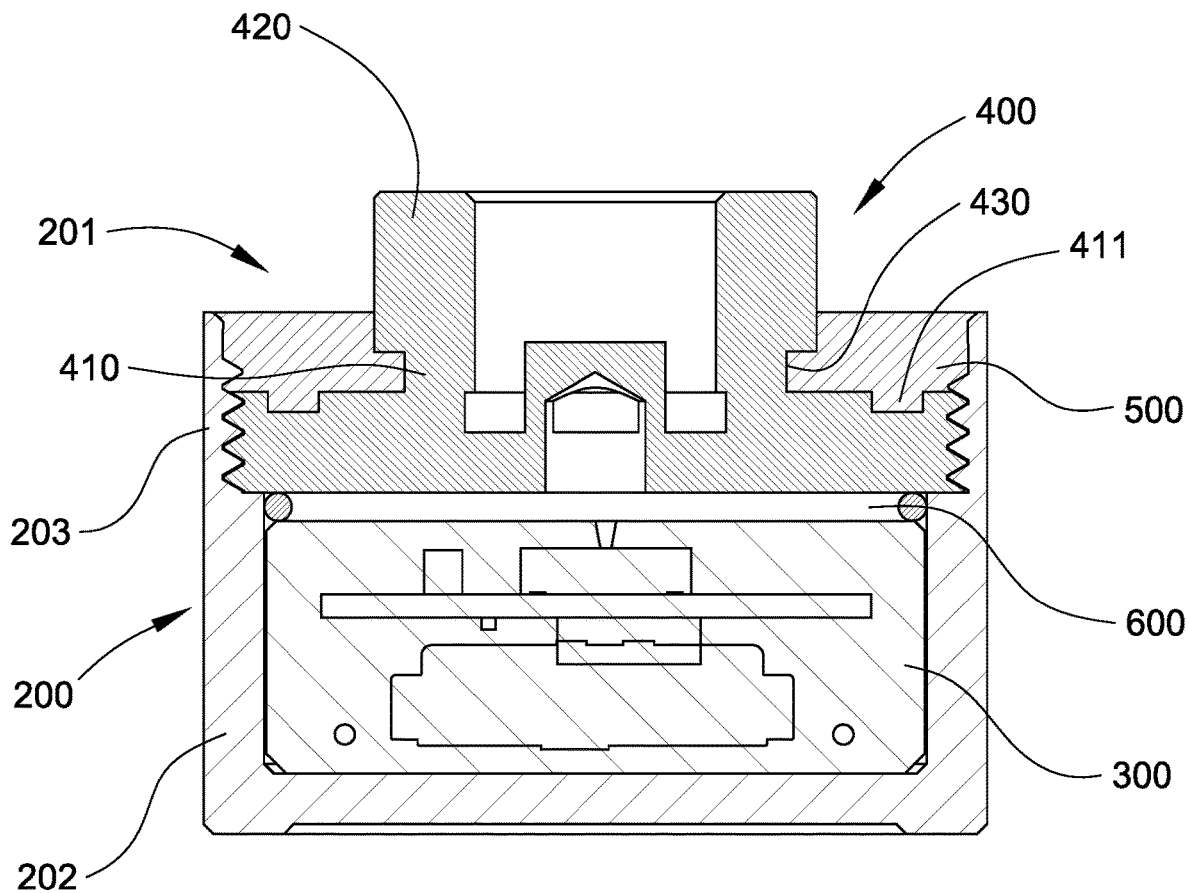
FIG. 3B is a section view of the tire pressure sensor structure of FIG. 3A.

Referring to the embodiments of FIG. 3A and FIG. 3B, the difference between this embodiment and FIGS. 2A and 2B is that, unlike the through holes shown in FIGS. 2A and 2B, the insert molding space 411 in this embodiment are blind holes set on base 410. The shape of the base 410 of the present embodiment is simpler and with the convenience in machining. Along with this, the structure of the molding body 500 is more integral and therefore has a higher mechanical strength.

Figure 4A:
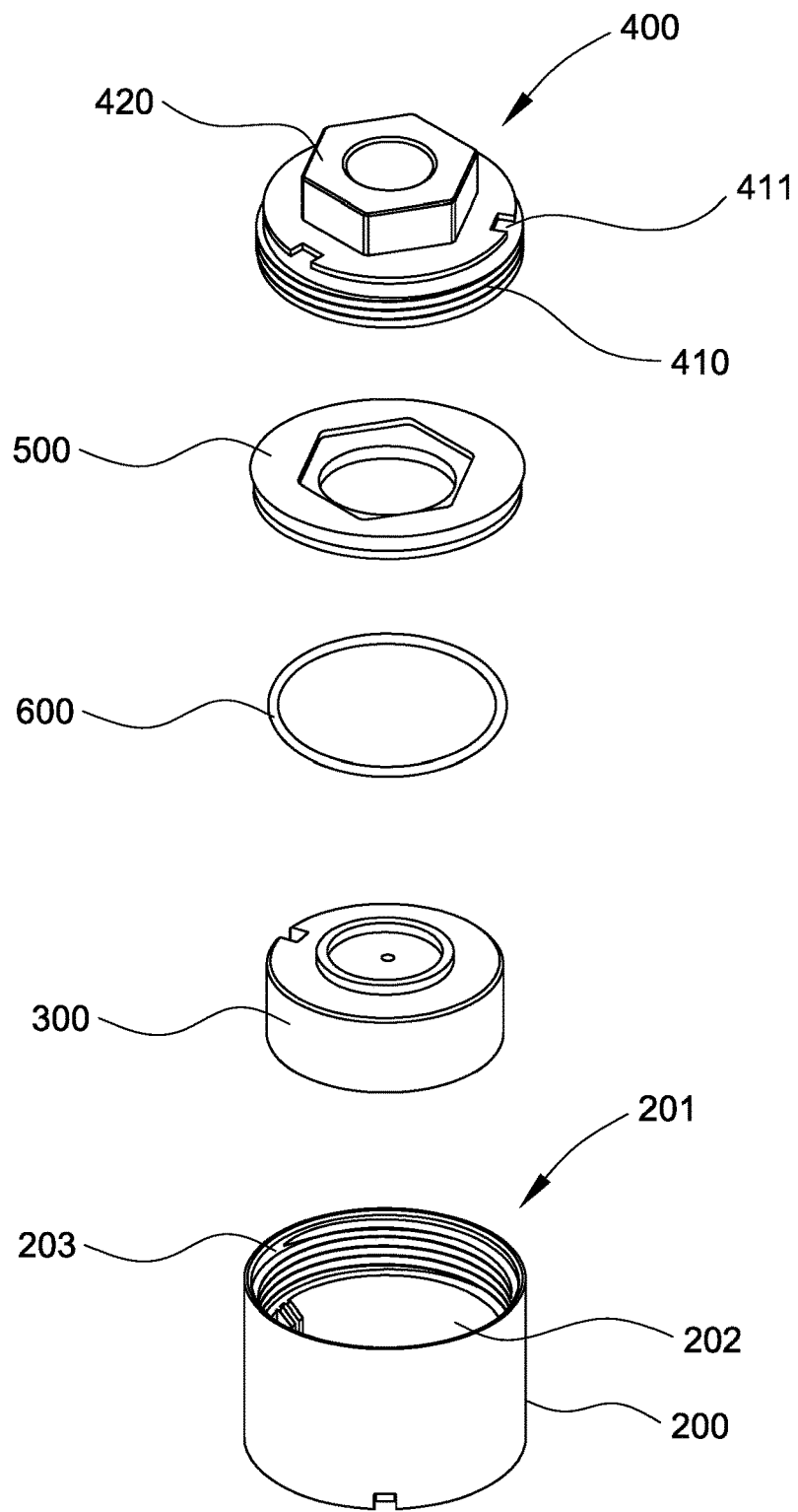
FIG. 4A is an exploded view of a tire pressure sensor structure according to still another embodiment of the present disclosure.
Figure 4B:
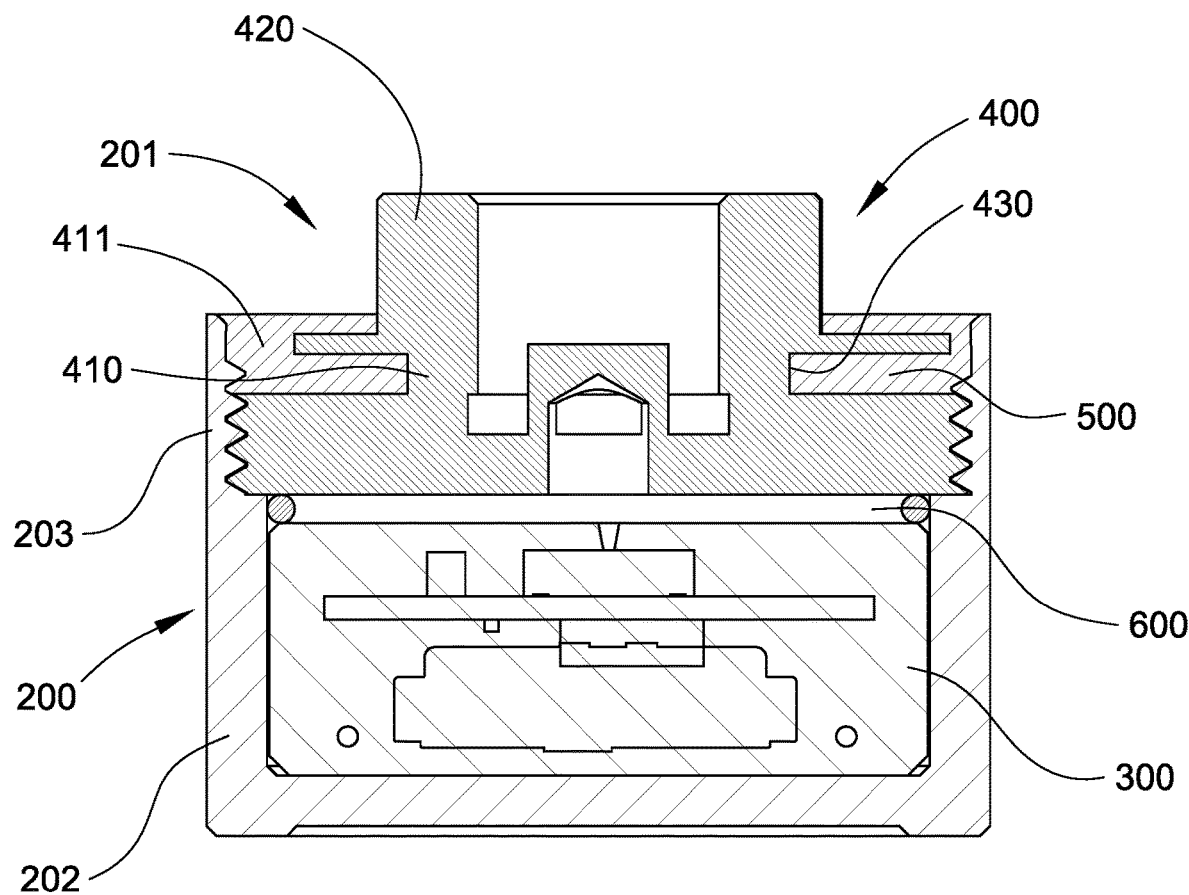
FIG. 4B is a section view of the tire pressure sensor structure of FIG. 4A.

In the present disclosure, the insert molding space 411 is alternative so not limited as a specific shape. As shown in FIG. 4 and FIG. 4B, the shape of the insert molding space 411 can also be changed to a polygonal hole located at the edge of the base 410.

Figure 5A:
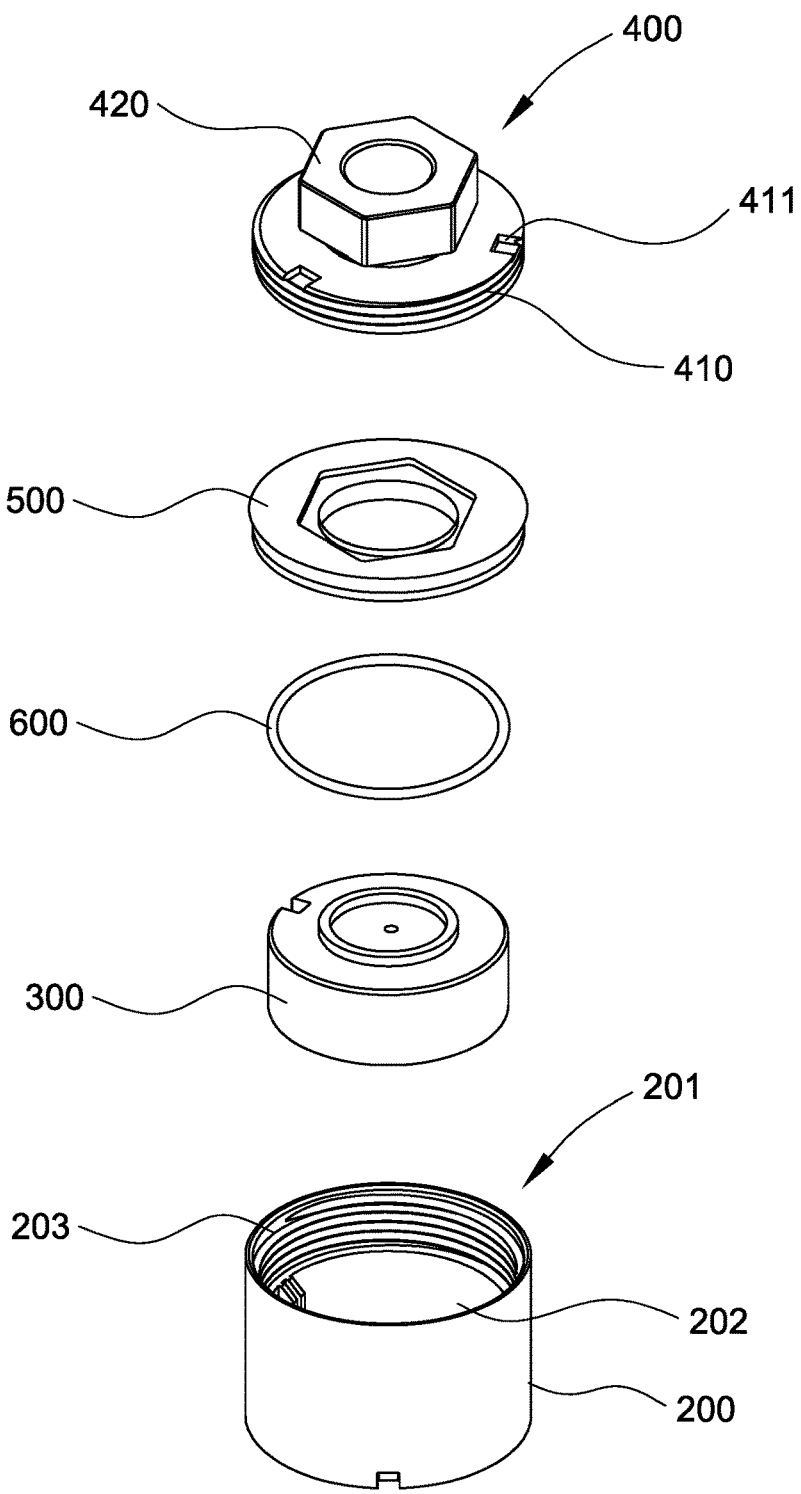
FIG. 5A is an exploded view of a tire pressure sensor structure according to yet still another embodiment of the present disclosure.
Figure 5B:
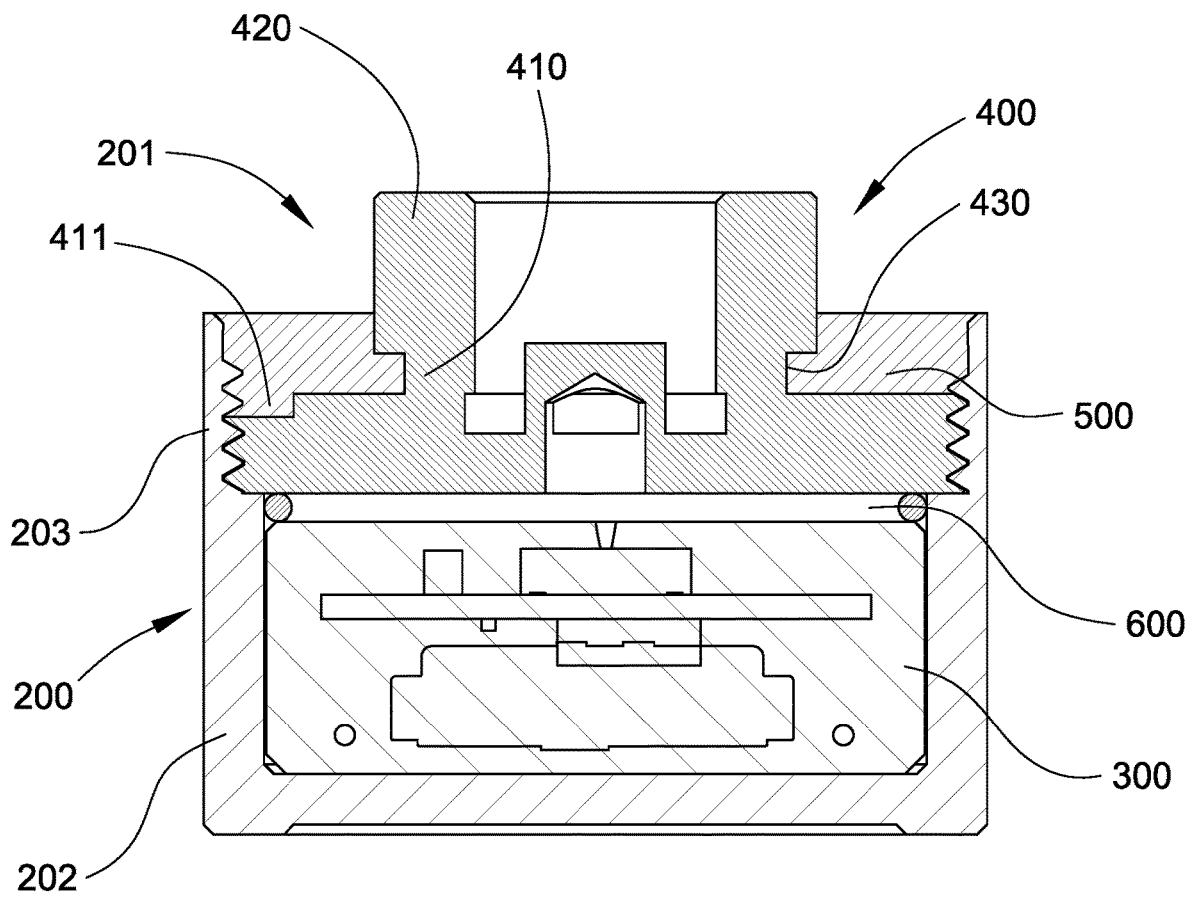
FIG. 5B is a section view of the tire pressure sensor structure of FIG. 5A.

Referring to the embodiments of FIG. 5A and FIG. 5B, corresponding to FIGS. 3A and 3B, the insert molding space 411 may be a blind hole set on the base 410.

It should be noted that the number, position, or implementation aspect of the insert molding space 411 described in the above embodiments is merely illustrative of the present disclosure, and does not mean that the present disclosure can only be enabled by the above examples.

Figure 6:
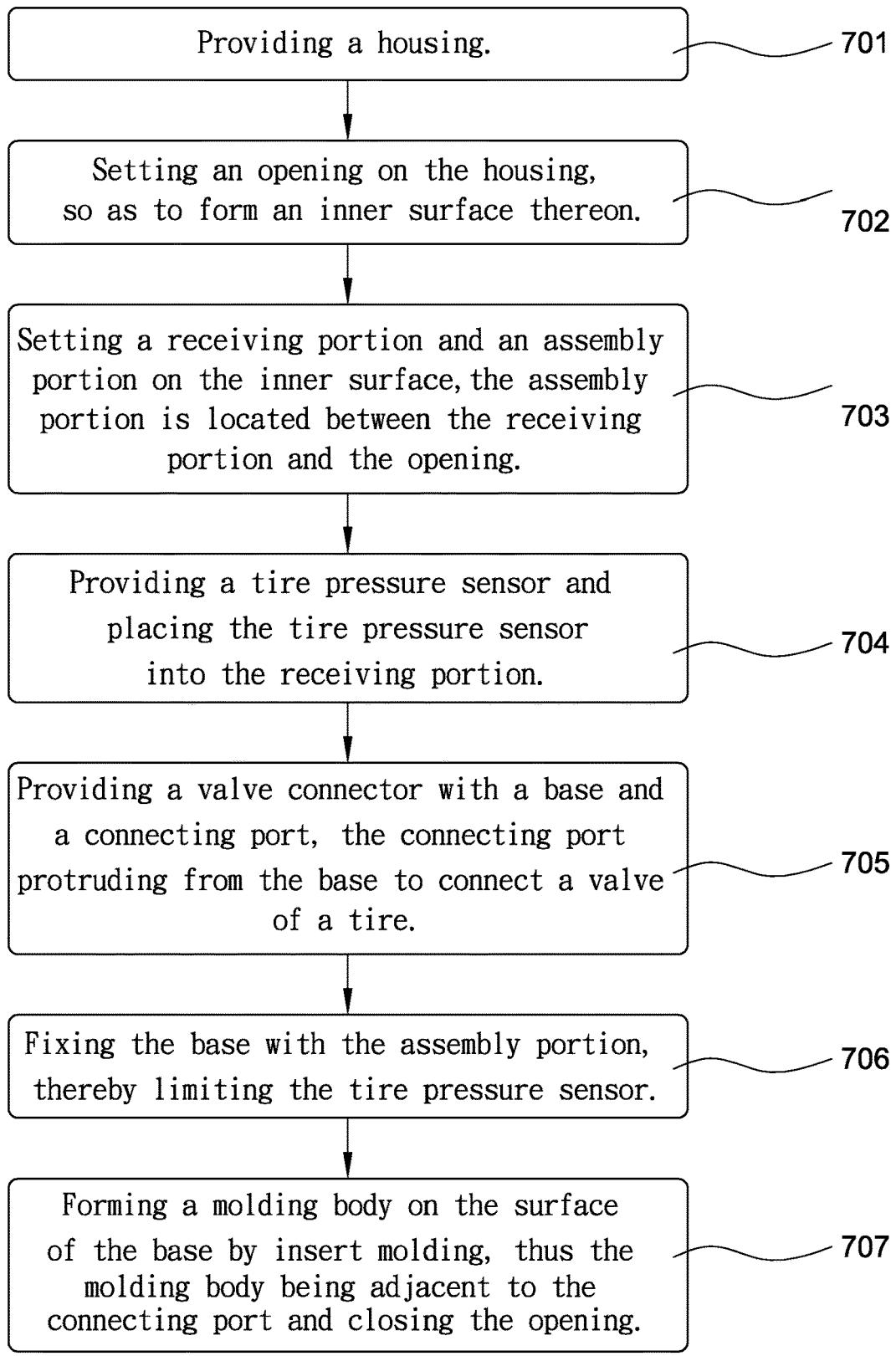
FIG. 6 is a flow diagram of a tire pressure sensor forming method according to one embodiment of the present disclosure.

Please refer to FIG. 6 with reference to FIGS. 2A to 5B, a tire pressure sensor forming method 700 includes the following steps. Step 701 is providing a housing 200. Step 702 is setting an opening 201 on the housing 200, so as to form an inner surface thereon. Step 703 is setting a receiving portion 202 and an assembly portion 203 on the inner surface, the assembly portion 203 is located between the receiving portion and the opening 201. As previously stated, the shape or combination of the assembly portions 203 is still not a limitation of the present disclosure.

Step 704 is providing a tire pressure sensor 300 and placing the tire pressure sensor 300 into the receiving portion 202. Step 705 is providing a valve connector 400 with a base 410 and a connecting port 420, the connecting port 420 protruding from the base 410 to connect a valve of a tire. Step 706 is fixing the base 410 with the assembly portion 203, thereby limiting the tire pressure sensor 300. Forming a molding body 500 on the surface of the base 410 by insert molding, thus the molding body 500 being adjacent to the connecting port 420 and closing the opening 201.

Advantageously, the two housings assembled to each other in prior art are replaced by that the base 410 of the valve connector 400 closes the tire pressure sensor 300, which can greatly reduce the volume of the tire pressure sensor product.

Apart from the above mentioned, since all of the airtight operations can be completed by single-insert molding process in this embodiment, the process efficiency can be remarkably improved. Furthermore, because insert molding can automatically adapt to other components with different shapes or sizes, therefore this embodiment can be flexibly applied to a variety of valve connector 400 for use in tires of different types of vehicles.

Besides, owing to the tire pressure sensor 300 is disposed on the inner side of the base 410, the injection pressure from the machine during the insert molding process will be withstood by the base 410, thus to protect the tire pressure sensor 300 placed internally.

In one embodiment, the tire pressure sensor forming method 700 further includes setting at least one insert molding space 411 on the surface of the base 410, thus the molding body 500 closes the insert molding space 411 during the forming process. Accordingly, the molding body 500 is nonrotatable relative to the valve connector 400 after being filled into the insert molding space 411 and shaped, so that achieving radial fixation.

The tire pressure sensor forming method 700 can further include providing a washer 600 which the outer diameter thereof is greater than or equal to the outer diameter of the tire pressure sensor 300; and setting the washer 600 between the base 410 and the tire pressure sensor 300.

The advantage of adding the washer 600 is as described in the foregoing embodiment of the tire pressure sensor structure 100, and therefore not be stated repletely herein.

The further embodiments of the foregoing embodiment of the tire pressure sensor structure 100 are equally applicable to the present embodiment. More precisely, the insert molding space 411 can be a round hole, a polygon hole or other shape, and may be carried out as a blind hole or a through hole, but is still not limited to the embodiment.

In the embodiment, the valve connector 400 can be provided with a narrowing portion 430, which is filled by its shape by the molding body 500 during the forming process. Additionally, the valve connector 400 can be made of metal. In another alternative embodiment, the base 410 can be replaced with a plastic material. As mentioned above, the molding body 500 can also be made of plastic.

According to the foregoing embodiment and example, the present disclosure has at least the following advantages. Firstly, the present disclosure applies the insert molding the insert molding technique to integrally form a tire pressure sensor structure, thus to greatly reduce the volume of a tire pressure sensor product. Secondly, the present disclosure utilizes the insert molding to achieve hermetic sealing, which can be applied to various sizes of tire pressure sensor structures, and therefore be flexible in industrial application. Thirdly, the present invention ensures the airtightness of the tire pressure sensor structure through only one insert molding process, accordingly, while improving process efficiency, the present disclosure also significantly improves the accuracy of the measurement of the tire pressure sensor.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A tire pressure sensor structure, comprising:
    a housing with an opening which having:
        a receiving portion located on the inner surface of the housing; and
        an assembly portion located between the receiving portion and the opening;
    a tire pressure sensor placed into the receiving portion;
    a valve connector having:
        a base fixed with the assembly portion for limiting the tire pressure sensor; and
        a connecting port protruding from the base to connect a valve of a tire; and
    a molding body formed on the surface of the base and adjacent to the connecting port to close the opening.

2. The tire pressure sensor structure of claim 1, wherein the surface of the base is with at least one insert molding space, and the molding body closes the insert molding space.

3. The tire pressure sensor structure of claim 2, wherein the insert molding space is a round hole or a polygon hole.

4. The tire pressure sensor structure of claim 2, wherein the insert molding space is a blind hole or a through hole.

5. The tire pressure sensor structure of claim 1, wherein the valve connector is with a narrowing portion, and the molding body is filled into the narrowing portion.

6. The tire pressure sensor structure of claim 1, further comprising:
    a washer disposed between the base and the tire pressure sensor, and the outer diameter of the washer is greater than or equal to the outer diameter of the tire pressure sensor.

7. The tire pressure sensor structure of claim 1, wherein the material of the valve connector is metal.

8. The tire pressure sensor structure of claim 1, wherein the material of at least one of the molding body and the base is plastic.

9. A tire pressure sensor forming method, comprising:
    providing a housing;
    setting an opening on the housing, so as to form an inner surface thereon;
    setting a receiving portion and an assembly portion on the inner surface, wherein the assembly portion is located between the receiving portion and the opening;
    providing a tire pressure sensor and placing the tire pressure sensor into the receiving portion;
    providing a valve connector with a base and a connecting port, the connecting port protruding from the base to connect a valve of a tire;
    fixing the base with the assembly portion, thereby limiting the tire pressure sensor; and
    forming a molding body on the surface of the base by insert molding, thus the molding body being adjacent to the connecting port and closing the opening.

10. The tire pressure sensor forming method of claim 9, further comprising:
    setting at least one insert molding space on the surface of the base, thus the molding body closing the insert molding space during the forming process.

11. The tire pressure sensor forming method of claim 10, wherein the insert molding space is a round hole or a polygon hole.

12. The tire pressure sensor forming method of claim 10, wherein the insert molding space is a blind hole or a through hole.

13. The tire pressure sensor forming method of claim 9, further comprising:
    providing a washer which the outer diameter thereof is greater than or equal to the outer diameter of the tire pressure sensor; and
    setting the washer between the base and the tire pressure sensor.

14. The tire pressure sensor forming method of claim 9, wherein the valve connector is with a narrowing portion filled by the molding body.

15. The tire pressure sensor forming method of claim 9, wherein the material of the valve connector is metal.

16. The tire pressure sensor forming method of claim 9, wherein the material of at least one of the molding body and the base is plastic.

* * * * *